US010169423B2

(12) United States Patent
Bhatia et al.

(10) Patent No.: US 10,169,423 B2
(45) Date of Patent: Jan. 1, 2019

(54) RANKING ANSWERS IN GROUND TRUTH OF A QUESTION-ANSWERING SYSTEM

(71) Applicant: International Business Machines Corporation, Armonk, NY (US)

(72) Inventors: Dimple Bhatia, San Jose, CA (US); Armageddon R. Brown, San Jose, CA (US); Donna K. Byron, Petersham, MA (US); Mary D. Swift, Rochester, NY (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 14/988,780

(22) Filed: Jan. 6, 2016

(65) Prior Publication Data

US 2017/0192976 A1 Jul. 6, 2017

(51) Int. Cl.
*G06F 17/30* (2006.01)
(52) U.S. Cl.
CPC .... *G06F 17/3053* (2013.01); *G06F 17/30011* (2013.01); *G06F 17/3043* (2013.01)
(58) Field of Classification Search
CPC .......... G06F 17/3053; G06F 17/30011; G06F 17/3043
USPC ....................................................... 707/723
See application file for complete search history.

(56) References Cited

U.S. PATENT DOCUMENTS

| 7,756,800 | B2 | 7/2010 | Chidlovskii |
| 7,860,881 | B2 | 12/2010 | Haselden et al. |
| 8,140,323 | B2 | 3/2012 | Johnson et al. |
| 8,275,803 | B2* | 9/2012 | Brown ............. G06F 17/30654 705/14.44 |
| 8,340,955 | B2 | 12/2012 | Brown et al. |
| 8,543,565 | B2 | 9/2013 | Feng |
| 8,612,373 | B2 | 12/2013 | Chidlovskii |
| 8,645,391 | B1 | 2/2014 | Wong |
| 8,788,498 | B2 | 7/2014 | Kannan et al. |

(Continued)

OTHER PUBLICATIONS

Brown, Eric W.., "UIMA Overview and Approach to Interoperability", © 2007 IBM Corporation, pp. 1-33.*

(Continued)

*Primary Examiner* — Robert Stevens
(74) *Attorney, Agent, or Firm* — Arnold B. Bangali

(57) ABSTRACT

A computer-implemented method for ranking answers of question-answer pairs in ground truth. The computer-implemented method includes annotating, via an annotation tool, the domain dictionary, including, at least one or more of lexicons, glossaries, knowledge base query for ranking the question-answer pairs. The computer-implemented method further includes defining search patterns of the annotated domain dictionary. The computer-implemented method further includes searching a documents corpus or knowledge based query of the domain dictionary for candidate answers of the question-answer pairs, based on the defined search patterns, the candidate are returned based on the search. The computer-implemented method for evaluating the candidate answers with the annotation tool to verify correctness or acceptability of the returned candidate answers based on the search.

17 Claims, 4 Drawing Sheets

(56) References Cited

U.S. PATENT DOCUMENTS

| | | | | |
|---|---|---|---|---|
| 8,819,007 | B2* | 8/2014 | Brown | G06F 17/30654 706/12 |
| 2008/0195378 | A1 | 8/2008 | Nakazawa et al. | |
| 2009/0287678 | A1 | 11/2009 | Brown et al. | |
| 2010/0191686 | A1* | 7/2010 | Wang | G06F 17/30634 706/46 |
| 2011/0066587 | A1 | 3/2011 | Ferrucci et al. | |
| 2011/0125734 | A1 | 5/2011 | Duboue et al. | |
| 2012/0290292 | A1 | 11/2012 | Liu et al. | |
| 2013/0007033 | A1* | 1/2013 | Brown | G06F 17/30654 707/764 |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |
| 2013/0226846 | A1 | 8/2013 | Li et al. | |
| 2013/0262501 | A1* | 10/2013 | Kuchmann-Beauger | G06F 17/30958 707/769 |
| 2014/0046947 | A1 | 2/2014 | Jenkins et al. | |
| 2014/0297571 | A1 | 10/2014 | Beamon et al. | |
| 2014/0358890 | A1* | 12/2014 | Chen | G06F 17/30867 707/710 |

OTHER PUBLICATIONS

Ferrucci, David, et al., "Towards an Interoperability Standard for Text and Multi-Modal Analytics", IBM Research Report, RC24122 (W0611-188) Nov. 28, 2006, pp. 1-106.*

Götz, Thilo, et al., "Design and implementation of the UIMA Common Analysis System", IBM Systems Journal, vol. 43, No. 3, © 2004, pp. 476-489.*

"Annotators—IBM Content Analytics with Enterprise Search, Version 3.0.0", IBM Knowledge Center, article last updates May 2012, pp. 1-3.*

Singer, Jane E., "Integrating UIMA annotators with Content Classification decision plans—A Medical Organization Use Case", IBM, Mar. 13, 2013, pp. 1-30.*

Gondek, David C., et al., "A framework for merging and ranking of answers in DeepQA", IBM Journal of Research & Development, vol. 56, No. 3/4, Paper 1, May/Jul. 2012, pp. 1-12.*

Ferrucci, David A., "Introduction to 'This is Watson'", IBM Journal of Research & Development, vol. 56, No. 3/4, Paper 1, May/Jul. 2012, pp. 1-15.*

Chu-Carroll, Jennifer, et al., "In Question Answering, Two Heads Are Better Than One", HLT-NAACL 2003, Edmonton, Alberta, Canada, May-Jun. 2003, pp. 24-31.*

Chai, Joyce Y., et al., "Discourse Structure for Context Answering", HLT-NAACL 2004: Workshop on Pragmatics on Question Answering, Boston, MA, May 2-7, 2004, Ass'n for Computational Linguistics, pp. 23-30.*

Zhao, Jian, et al., "Facilitating Discourse Analysis with Interactive Visualization", IEEE Transactions on Visualization and Computer Graphics, vol. 18, No. 12, Dec. 2012, pp. 2639-2648.*

Kalyanpur, Aditya, et al., "Leveraging Community-Built Knowledge for Type Coercion in Question Answering", ISWC 2011, Part II, LNCS 7032, © Springer-Verlag, Berlin, Germany, 2011, pp. 2639-2648.*

Agichtein et al., "Question Answering over Implicitly Structured Web Content", In Proceedings of the 2007 IEEE/WIC/ACM International Conference on Web Intelligence, Nov. 2007, 8 pages.

Cucerzan et al., "Factoid Question Answering over Unstructured and Structured Web Content", Proceedings of the Fourteenth Text Retrieval Conference (TREC 2005), National Institute of Standards and Technology (NIST), Nov. 15-18, 2005, 6 pages.

High, "The Era of Cognitive Systems: An Inside Look at IBM Watson and How it Works", IBM Corporation, Redbooks, Dec. 12, 2012, 16 pages.

McCord et al., "Deep parsing in Watson", IBM J. Res. & Dev. vol. 56 No. 3/4 Paper 3, May/Jul. 2012, pp. 3:1-3:15.

Ramprasath et al., "Improving QA performance through semantic reformulation", 2012 Nirma University International Conference on Engineering (NUiCONE) 2012, Dec. 6-8, 2012, pp. 1-4.

Yuan "Watson and healthcare, How natural language processing and semantic search could revolutionize clinical Decision support", IBM developerWorks, IBM Corporation, Apr. 12, 2011, 14 pages.

* cited by examiner

RANKING ANSWERS IN GROUND TRUTH OF A QUESTION-ANSWERING SYSTEM

FIELD OF INVENTION

The present invention generally relates to computing systems, and more particularly to ranking answers of question-answer pairs in ground truth of a question-answer pair system environment. Querying a database to retrieve an answer, such as, telling a robot to perform an action, or teaching a computer to play a game, are tasks requiring communication with question-answering systems. Developing a ground truth for a question-answering system may require human subject matter experts, such as, annotators to identify question and answer pairs, for the question-answering system, where, for instance, the answers are typically passages in documents. Nevertheless, identifying all appropriate answers to a question can be a time consuming and challenging task, as there may be thousands of documents in a corpus for the ground truth, and there can be multiple possible answers to a given question.

SUMMARY

According to one embodiment, a computer-implemented method for ranking answers of question-answer pairs in ground truth is provided. The computer-implemented method includes annotating, via an annotation tool, the domain dictionary, including, at least one or more of lexicons, glossaries, knowledge base query for ranking the question-answer pairs. The computer-implemented method further includes searching a documents corpus or knowledge based query of the domain dictionary for candidate answers of the question-answer pairs, based on the defined search patterns, the candidate are returned based on the search. The computer-implemented method further includes evaluating the candidate answers with the annotation tool to verify correctness or acceptability of the returned candidate answers based on the search, if the answers are acceptable, the annotation tool assigns an acceptable ranking to the candidate answers based on a scale.

According to another embodiment, a computer system for ranking answers of question-answer pairs in ground truth is provided. The computer system includes one or more processors, one or more computer-readable memories, one or more computer-readable tangible storage devices and program instructions which are stored on at least one of the one or more storage devices for execution by at least one of the one or more processors via at least one of the one or more memories. The computer system further includes program instructions to annotate, via an annotation tool, the domain dictionary, including, at least one or more of lexicons, glossaries, knowledge base query for ranking the question-answer pairs. The computer system further includes programs instructions to define search patterns of the annotated domain dictionary. The computer program instructions further includes program instructions to search a documents corpus or knowledge based query using domain dictionary for candidate answers of the question-answer pairs, based on the defined search patterns, the candidate are returned based on the search. The computer system further includes program instructions to evaluate the candidate answers with the annotation tool to verify correctness or acceptability of the returned candidate answers based on the search, if the answers are acceptable, the annotation tool assigns an acceptable ranking to the candidate answers based on a scale.

According to yet another embodiment, a computer program product for ranking answers of question-answer pairs in ground truth is provided. The computer program product includes one or more computer-readable tangible storage devices and program instructions stored on at least one of the one or more storage devices. The computer program product further includes program instructions to annotate, via an annotation tool, the domain dictionary, including, at least one or more of lexicons, glossaries, knowledge base query for ranking the question-answer pairs. The computer program product further includes programs instructions to define search patterns of the annotated domain dictionary. The computer program product further includes program instructions to search a documents corpus or knowledge based query using domain dictionary for candidate answers of the question-answer pairs, based on the defined search patterns, the candidate are returned based on the search. The computer program product further includes program instructions to evaluate the candidate answers with the annotation tool to verify correctness or acceptability of the returned candidate answers based on the search, if the answers are acceptable, the annotation tool assigns an acceptable ranking to the candidate answers based on a scale.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
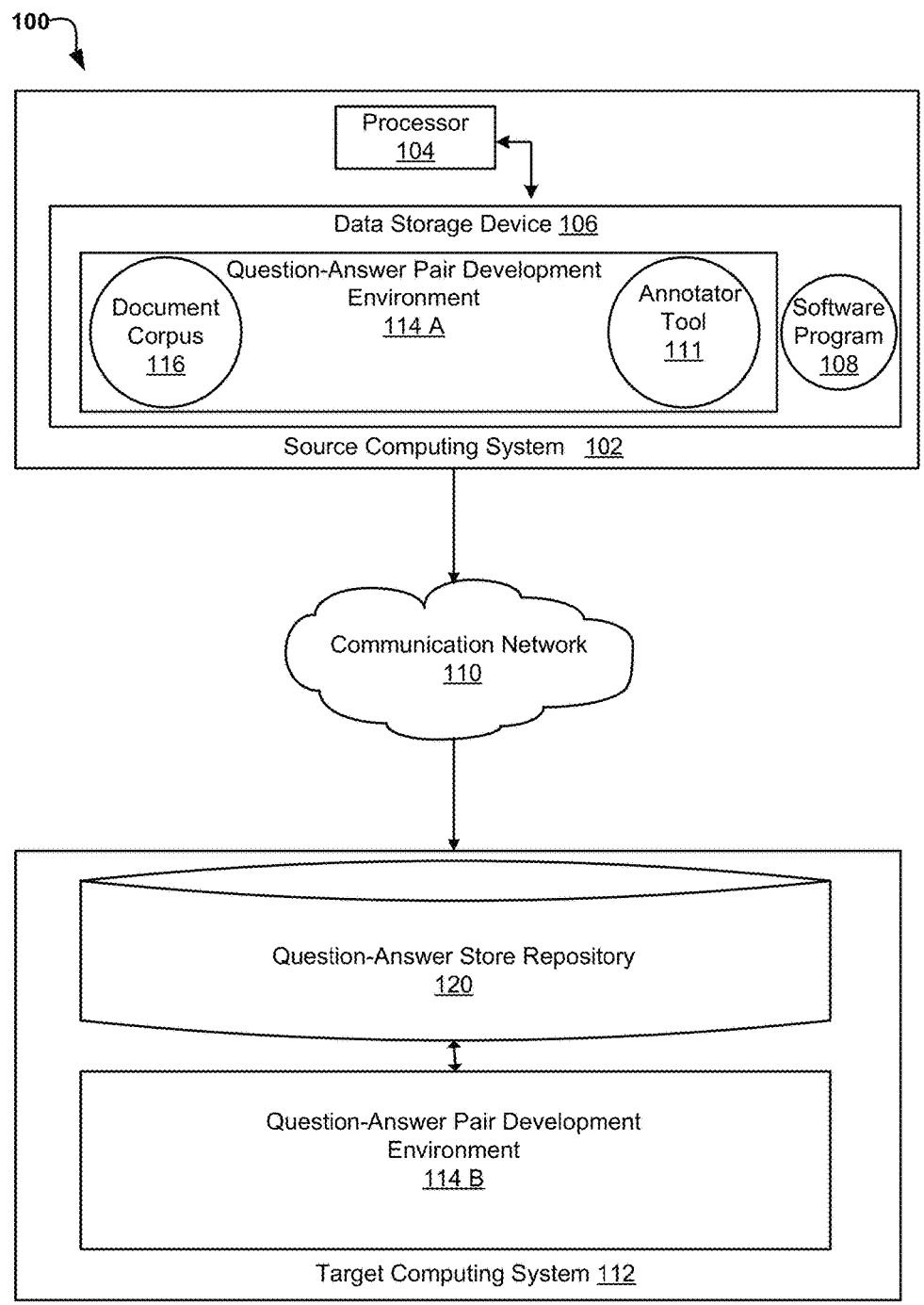
FIG. 1 illustrates a networked computer environment according to one embodiment.

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Developing a ground truth for a question answering system such as the Watson Engagement Advisor requires human subject matter experts known as annotators to identify question and answer pairs, where the answers are typically passages in documents. Identifying all appropriate answers to a question can be a time consuming and challenging task, as there may be thousands of documents in the corpus for ground truth, and there can be multiple possible answers to a given question. Not all answers are perfect or optimal. Some answers are less direct, contain extraneous material, or are less than perfect, yet are 'acceptable' answers. A question answering pipeline such as Watson can benefit from distinctions that classify answers on a scale. Current Watson question/answer ground truth markup format allows distinctions between 'perfect' answers and 'acceptable' answers, however there has been very little prior art focused on collecting other than perfect answers.

Embodiments of the present invention provide a method that allows annotators to use a document search and discovery tool to define patterns for answer passages and retrieve documents matching the patterns. The patterns can be general or customized to the domain using a dictionary of domain terms. Annotators can prioritize answers as preferred or acceptable using this customizable document search. The output from the system is an expanded ground truth and also a set of patterns that can be used on subsequent questions.

For example, using the current technique, given a particular question, the annotator uses a search tool such as Watson GTT to find answer passages within the corpus, and then must judge each passage to decide whether it is a) an exact answer to the question b) an acceptable answer that provides helpful information while not directly answering the question or c) not at all an answer. Before seeing the entire result set, however, the annotator has incomplete information to decide how good each answer is. For instance, one might not know how good this is as an answer until you see other ones, perhaps there's another more concise answer in the corpus, or maybe this is the most condensed answer that someone could create.

For example, according to embodiments, the corpus may not even contain a direct answer to the question. Having a threshold of 'acceptable' answers, having a tool that encourages the annotator to locate both perfect and acceptable answers, and later ranking the answers along a scale from acceptable to perfect will help the annotator organize and tag all possibly helpful or relevant passages from the corpus, increase the number of passages collected for each question, and speed up the process by allowing the annotators to delay determining how good each answer is, as they are located.

Embodiments of the present invention allows annotators to find all documents in a corpus that contain answers for a question and review them together to rank the answers according to acceptability. Annotators define patterns, such as, keywords, regular expressions to discover documents that are likely to contain answers for a question. Locating answers in unstructured documents is a challenging task. There can be a lot of variation in the structure of an answer. Some answers can be single words or phrases, others can be whole paragraphs, others can be a link to a web page.

For example, for passage answers, information can be delivered in a concise or verbose manner. One author might take an entire page to make a point, decorating it with extra details or interesting anecdotes while another author provides a concise and direct answer. If the person asking the question is unfamiliar with the subject matter the most direct answer to the question might be expressed using terminology that is radically different from that contained in the question. Also, acceptable but not quite perfect answers can be even harder to locate.

When the answer is phrased with abbreviations, synonyms, or is provided as a parenthetical expression within a longer portion of text, both automated and manual methods will have difficulty locating the passage in order to associate it with the question. For instance, depending on the corpus, there may not be a perfect answer to the question, yet it would be good to collect all passages that do answer the question, albeit indirectly. As the corpus drifts over time, the passage with perfect answer may not be in the corpus any longer. It would be great to still have the acceptable answers.

Referring now to FIG. 1, a question-answer integrated systems environment 100, for ranking question-answer pairs from a corpus, text, or body of knowledge, by matching question-answer templates to the corpus, whereby an annotator tool is provided for ranking answer scores of the question-answer pairs along a variety of features, such as, passage length, directness of language, internal structure, voice structure, of the question-answer pairs, according to at least one embodiment. It should be appreciated that FIG. 1 provides only an illustration of one implementation and does not imply any limitations with regard to the environments in which different embodiments may be implemented. Many modifications to the depicted environment of FIG. 1 may be made based on design and implementation requirements.

The present invention provides a system platform of the question-answer integrated systems environment 100 that allows the annotators to discover all documents in the corpus or body of knowledge that contain answers for a question and, reviews, and ranks the answers according to acceptability of the answers, whereby the annotators define patterns, such as, keywords, regular expressions to discover documents that are likely to contain answers for a question and, are automatically suggested to get better answers for the annotators to annotate the question-answer pairs. The question-answer integrated systems environment 100 evaluates candidate answers of the question-answer pairs with the annotation tool to verify correctness or acceptability of the candidate answers and, wherein if the candidate answers are acceptable, the annotation tool assigns an acceptable ranking to the candidate answers based on a scale.

The question-answer integrated systems environment 100 may include a source computing system 102 with a processor 104 and a data storage device 106 that is enabled to run, or execute program instructions of a software program 108. The source computing system 102 may also include a question-answer development pair environment 114A, for managing an administrative computing interface, for performing system administrative functions of annotator tool 111 for identifying documents of document corpus 116, such as, content, such as, text, or body of knowledge in an information handling system or body of knowledge that contains answers for a question and, reviews, and ranks answers of the question-answer pairs according to acceptability of the answers, based on the received content, according to embodiments.

The virtual memory 118 of the source computing system 102 may comprise, for example one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of the source computing device 102, for ensuring that display of the interface for managing an administrative interface, by a plurality of users, for monitoring and tracking, activities of the plurality of users, for assisting the plurality of users in the follow-through and completion of activities, of the plurality of users, according to embodiments.

The question-answer integrated systems environment 100 may also include a target computing system 112, running an question-answer pair environment 114B, and interconnected with source computing system 102, over communication network 110, for generating question-answer pairs from a corpus, text, or body of knowledge, whereby answers of the question-answer pairs are ranks according to a scale of acceptability of development environment 114A.

The communication network 110 may also include connections, such as wired communication links, wireless communication links, or fiber optic cables. The communication network 110 may also be implemented as a number of different types of networks, including, for example, a local area network (LAN), wide area network (WAN) or a packet switched telephone network (PSTN), or some other networked system. For example, the question-answer systems environment 100 may utilize the Internet with the communication network 110 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

The communication network 110 may include a public switched network and/or a satellite network, or one or more networks of any kind that can provide communication links between various devices and computers connected together within a multi-service cloud management environment, for tracking the beginning and completion of tasks of a plurality of users, of a plurality of target computing system 112 and question-answer pair generation environment 114B.

It should be appreciated that the computing environment 100 of FIG. 1 provides only an illustration of one implementation and, does not imply any limitations with regard to the environments in which different embodiments may be implemented. Many modifications to the depicted environments may be made based on design and implementation requirements. The a question-answer systems environment 100 may also include a plurality of source computing system 102 and target computing system 112, only one of which is shown, at least in FIG. 1. For example, the question-answer pair development environment 114A may communicate with question-answer pair generation environment 114B, running on target computing system 112, via the communication network 110, ranks answers of the question-answer pairs according to acceptability of the answers, from a corpus, text, or body of knowledge, within the question-answer integrated systems environment 100.

The communication network 110 may also include connections, such as wire, wireless communication links, or fiber optic cables. As will be discussed with reference to FIG. 4, source computing system 102 may include internal components 800a and external components 900a, respectively, and computer 102 may include internal components 800b and external components 900b, respectively. The source computing system 102 may be, for example, a laptop, tablet, or notebook personal computer (PC), a desktop computer, a mainframe or minicomputer, or a personal digital assistant (PDA). The source computing system 102 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for managing an administrative computing interface.

The database storage device 106 of computer 102 is any type of storage device, storage server, storage area network, redundant array of independent discs (RAID), cloud storage service, or any type of data storage. The database storage device 106 can also be a relational model database server for storing program instructions for displaying information pertaining to generation of question-answer pair via the question-answer development environment 114A, for viewing by client, or systems administrator of via the question-answer development environment 114A. The target computing system 112 can be, for example, a mainframe server computer system such as a management server, a web server, or any other electronic device or computing system capable of transmitting data, between target computing system 112 and source computing system 102, for performing the generation of the question-answer pairs, whereby answers of the question answer pairs are ranked according to acceptability of the answers.

The target computing system 112 can also represent a "cloud" of computers interconnected by one or more networks, whereby, the target computing system 112 is a primary server of a plurality of server computing systems that utilizes clustered computers, when accessed through the cloud communication network 110. For example, according to embodiments, a cloud computing system can be an implementation of automatic deployment of question-answer pairs from a corpus, text, or body of knowledge, all within the question-answer integrated systems environment 100. The question-answer store repository 120, of target computing system 112, is any type of storage device, storage server, storage area network, redundant array of independent discs (RAID), cloud storage service, or any type of data storage for storing information relating for generation of question-answer pairs from the corpus, text, or body of the knowledge of the target computing system 112. Similarly, the question-answer store repository 120 can also be a relational model database server for storing program instructions for display information pertaining to generation of question-answer pairs within the question-answer integrated systems environment 100. The relational model for database management of the question-answer store repository 120 is based on first-order predicate logic. For example, in the relational model of a database, all data execution of integrated system application tests cases is represented in terms of tuples, grouped into relations.

Figure 2:
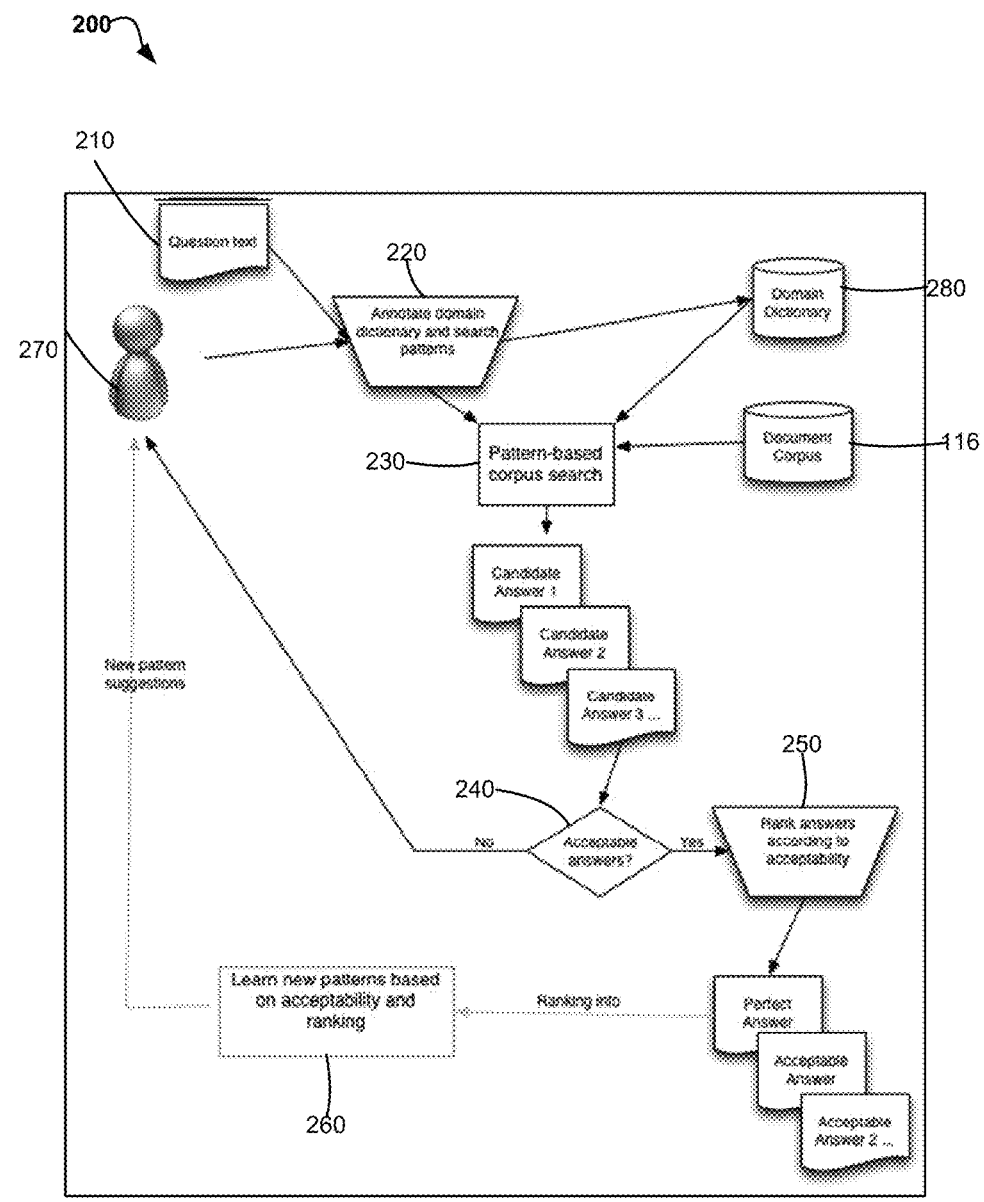
FIG. 2 illustrates a flow diagram for ranking answers of question-answer pairs in ground truth, or ranking answers of question-answer pairs in ground truth, according to embodiments according to at least one embodiment.

Referring now to FIG. 2, a flow diagram 200 for ranking answers of question-answer pairs in ground truth, or ranking answers of question-answer pairs in ground truth, according to embodiments.

It should be appreciated that FIG. 2 provides only an illustration of one implementation and does not imply any limitations with regard to the environments in which different embodiments may be implemented. Many modifications to the depicted environment of FIG. 2 may be made based on design and implementation requirements.

At step 220, question-answer pair development environment 114A, annotates document corpus 116 and defines search patterns of the domain dictionary 280 or document corpus 116 that are likely to contain answers for a question, for example, if novel terms, question text 210, and/or patterns are suggested by query of the question-answer pair development environment 114A, whereby, the search patterns are performed by an annotator 270 via annotator tool 111. At step 230, the question-answer pair development environment 114A utilizes the defined search patterns and domain terms to search the document corpus 116 and return answers for query of question-answer pair development environment 114A, according to embodiments. At decision 240, question-answer pair development environment 114A evaluates candidate answers via an annotator 270 the annotator tool 111 and, determines whether the candidate answers are correct or acceptable. If the answers are acceptable or better, then at step 250, annotator 270 assigns via annotator tool an acceptability or goodness ranking to the answers, based on a chosen scale. Thereafter, at step 260, question-answer pair development environment 114A identifies new patterns based on acceptability and ranking. For example, according to embodiments, features are automatically extracted from ranked acceptable answers, based on passage, length, sentence structure etc., whereby, new patterns are generated, based on acceptability and rankings, whereby the rankings are presented to the annotator 270 for review. The annotator 270 may use rankings to augment existing set of search patterns. However, if the answers are not acceptable, the annotator 270 annotates via annotates tool 111, augments or refines the domain terms searches patterns of the answers, according to embodiments.

Figure 3:
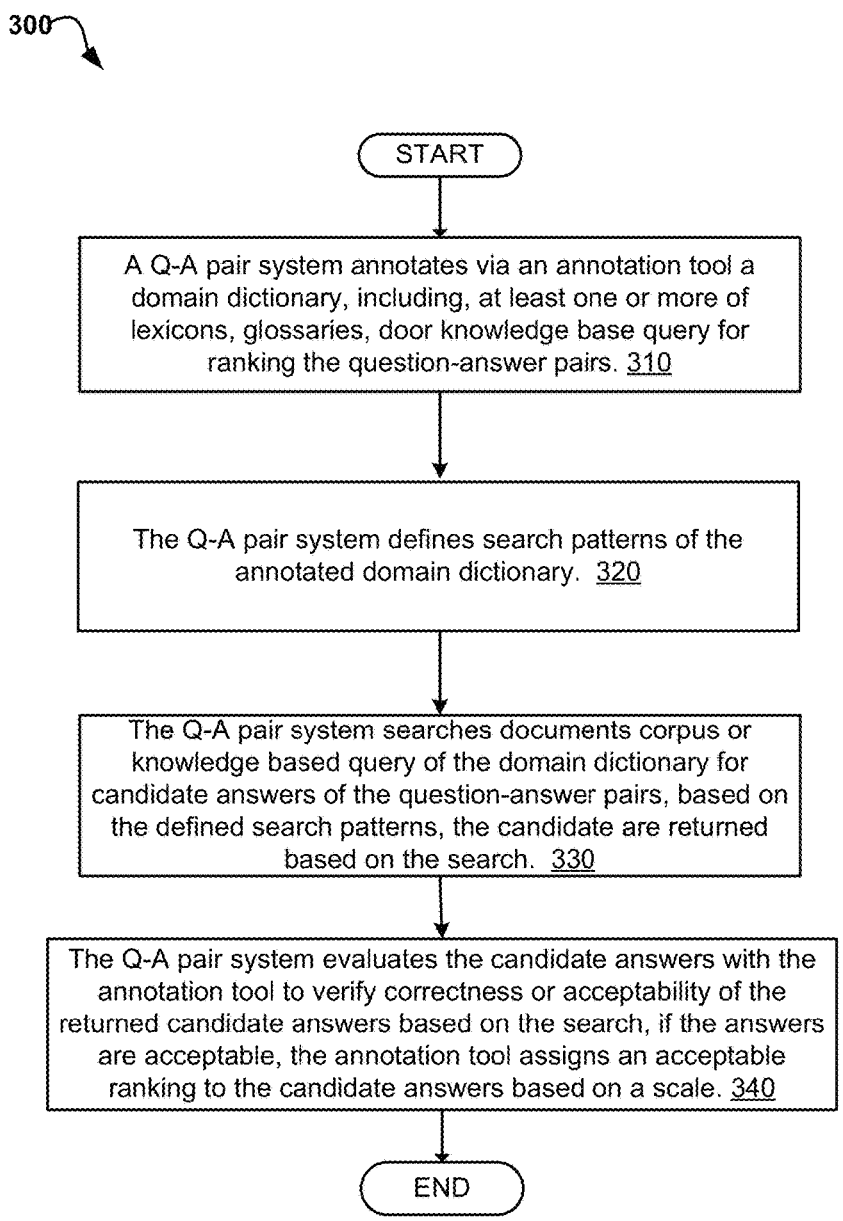
FIG. 3 illustrates an alternative flow diagram for ranking answers of question-answer pairs in ground truth, or ranking answers of question-answer pairs in ground truth, according to embodiments according to at least one embodiment.

Referring now to FIG. 3, is an alternative flow diagram 300 for ranking answers of question-answer pairs in ground truth, or ranking answers of question-answer pairs in ground truth, according to embodiments.

It should be appreciated that FIG. 3 provides only an illustration of one implementation and does not imply any limitations with regard to the environments in which different embodiments may be implemented. Many modifications to the depicted environment of FIG. 3 may be made based on design and implementation requirements.

At step 310, the question-answer pair development environment 114A annotates via an annotation tool 111 of the document corpus 116, including, at least one or more of lexicons, glossaries, knowledge base query for ranking the question-answer pairs. The annotator 270 utilizes the generated ranked patterns to augment existing search patterns via the annotator tool. At step 320, the question-answer pair development environment 114A defines search patterns of the annotated document corpus 116. At step 330, the question-answer pair development environment 114A searches a documents corpus or knowledge based query of the document corpus 116 for candidate answers of the question-answer pairs, based on the defined search patterns, the candidate are returned based on the search, according to embodiments. At step 340, the question-answer pair development environment 114A evaluates the candidate answers with the annotation tool to verify correctness or acceptability of the returned candidate answers based on the search. If the answers are acceptable, the annotation tool assigns an acceptable ranking to the candidate answers based on a scale. If acceptable candidate answers are not returned, the annotator tool augments or refines the domain terms and search patterns and re-searches the document corpus 116. Ranking patterns are generated based on acceptability and ranking. According to embodiments, acceptability features are automatically extracted from ranked acceptable answers. The acceptability features are automatically extracted from ranked acceptable answers.

Figure 4:
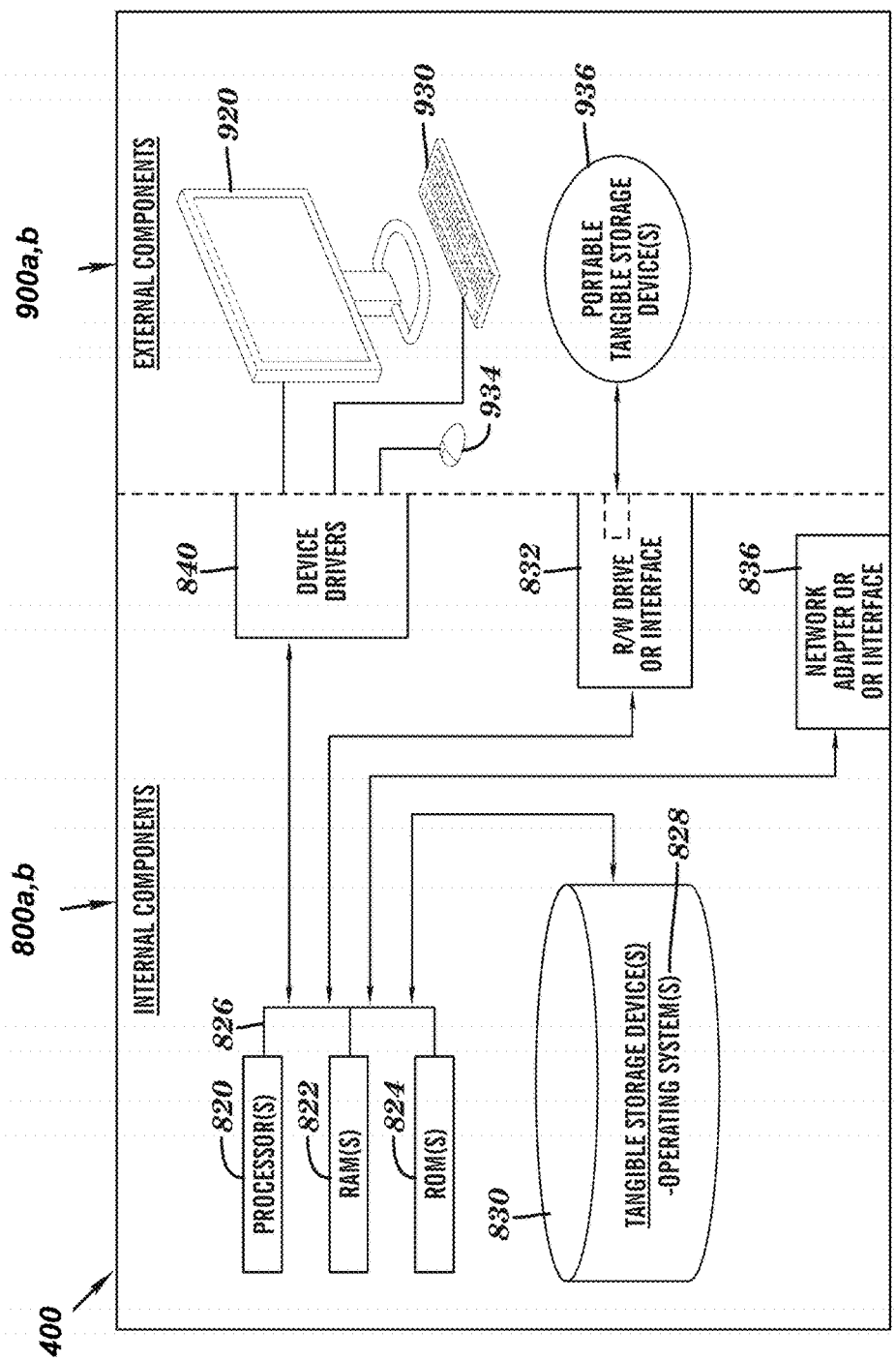
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Question-answer pair development environment 114A and question-answer pair development environment 114B (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage device 830. The one or more operating systems 828 and software programs 108 (FIG. 1) in source computing system 102 (FIG. 1) is stored on one or more of the respective computer-readable tangible storage device 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive.

Alternatively, each of the computer-readable tangible storage devices 830 is a semiconductor storage device such as ROM 824, EPROM, flash memory or any other computer-readable tangible storage device that can store a computer program and digital information. Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 (FIG. 1), such as can be stored on one or more of the respective portable computer-readable tangible storage device 936, read via the respective R/W drive or interface 832 and loaded into the computer-readable tangible storage device 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and client workforce data monitoring environment 114A (FIG. 1) in source computing system 102 (FIG. 1) and question-answer pair development environment 114B (FIG. 1), can be downloaded to source computing system 102 (FIG. 1) and target computing system 112 (FIG. 1), respectively from an external computer via a network (for example, the Internet, a local area network or other, wide area network) and respective network adapters or interfaces 836. From the network adapters or interfaces 836, the code software programs 108

(FIG. 1) and question-answer pair development environment 114A (FIG. 1) in computer 102 (FIG. 1) and question-answer pair development environment 114B in target computing system 112 (FIG. 1) are loaded into the respective computer-readable tangible storage device 830.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (computer-readable tangible storage devices 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for ranking answers of question-answer pairs in a ground truth, the computer-implemented method comprising:
    searching a documents corpus, using an annotated domain dictionary, for candidate answers of question-answer pairs, based on defined search patterns;
    evaluating the candidate answers with an annotation tool to verify acceptability of the candidate answers based on the search, wherein the evaluating includes automatically extracting acceptability features from the candidate answers, and wherein the verified acceptability of candidate answers is based on a threshold that identifies the candidate answers along a scale from acceptable to perfect candidate answers; and
    responsive to the candidate answers being acceptable, based on the evaluating, assigning an acceptable ranking to the candidate answers, wherein the ranking is based on length of the answers, sentence structure of the answers, directness of language of the answers, and internal structure of the answers.

2. The computer-implemented method of claim 1, further comprising:
    annotating, via the annotation tool, the domain dictionary for ranking question-answer pairs, wherein the domain dictionary includes at least one lexicon, at least one glossary, and a plurality of knowledge base queries; and
    defining, by the annotation tool, search patterns of the annotated domain dictionary.

3. The computer-implemented method of claim 1, wherein ranking patterns are generated based on acceptability and ranking.

4. The computer-implemented method of claim 3, wherein the generated ranked patterns are presented to an annotator of the annotator tool for review.

5. The computer-implemented method of claim 4, wherein the annotator utilizes the generated ranked patterns to augment existing search patterns via the annotator tool.

6. The computer-implemented method of claim 1, wherein if the acceptable candidate answers are not returned, the annotator tool augments or refines the domain terms and search patterns and re-searches the document corpus.

7. A computer system for ranking answers of question-answer pairs in ground truth, the computer-implemented method comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
    program instructions to search a documents corpus, using an annotated domain dictionary for candidate answers of question-answer pairs, based on defined search patterns;
    program instructions to evaluate the candidate answers with an annotation tool to verify acceptability of the candidate answers based on the search, wherein the evaluating includes automatically extracting acceptability features from the candidate answers, and wherein the verified acceptability of candidate answers is based on a threshold that identifies the candidate answers along a scale from acceptable to perfect candidate answers; and
    responsive to the candidate answers being acceptable, based on the evaluating, program instruction to assign an acceptable rank to the candidate answers, wherein the ranking is based on length of the answers, sentence structure of the answers, directness of language of the answers, and internal structure of the answers.

8. The computer system of claim 7, further comprising:
    program instructions to annotate, via the annotation tool, the domain dictionary for ranking question-answer pairs, wherein the domain dictionary includes at least one lexicon, at least one glossary, and a plurality of knowledge base queries; and
    program instructions to define, by the annotation tool, search patterns of the annotated domain dictionary.

9. The computer system of claim 7, wherein ranking patterns are generated based on acceptability and ranking.

10. The computer system of claim 9, wherein the generated ranked patterns are presented to an annotator of the annotator tool for review.

11. The computer system of claim 10, wherein the annotator utilizes the generated ranked patterns to augment existing search patterns via the annotator tool.

12. The computer system of claim 7, wherein if the acceptable candidate answers are not returned, the annotator tool augments or refines the domain terms and search patterns and re-searches the document corpus.

13. A computer program product for ranking answers of question-answer pairs in ground truth, the computer program-product comprising:
    one or more computer-readable tangible storage devices and program instructions stored on at least one of the one or more storage devices, the program instructions comprising:
    program instructions to search a documents corpus, using an annotated domain dictionary for candidate answers of question-answer pairs, based on defined search patterns;
    program instructions to evaluate the candidate answers with an annotation tool to verify acceptability of the candidate answers based on the search, wherein the evaluating includes automatically extracting acceptability features from the candidate answers, and wherein the verified acceptability of candidate answers is based on a threshold that identifies the candidate answers along a scale from acceptable to perfect candidate answers; and responsive to the candidate answers being acceptable, based on the evaluating, program instructions to assign an acceptable rank to the candidate answers, wherein the ranking is based on length of the answers, sentence structure of the answers, directness of language of the answers, and internal structure of the answers.

14. The computer system of claim 13, further comprising:

program instructions to annotate, via the annotation tool, the domain dictionary for ranking question-answer pairs, wherein the domain dictionary includes at least one lexicon, at least one glossary, and a plurality of knowledge base queries; and program instructions to define, by the annotation tool, search patterns of the annotated domain dictionary.

15. The computer program product of claim 13, wherein ranking patterns are generated based on acceptability and ranking.

16. The computer program product of claim 15, wherein the generated ranked patterns are presented to an annotator of the annotator tool for review.

17. The computer program product of claim 13, wherein if the acceptable candidate answers are not returned, the annotator tool augments or refines the domain terms and search patterns and re-searches the document corpus.

* * * * *